United States Patent [19]

Wiens

[11] Patent Number: 4,632,091
[45] Date of Patent: Dec. 30, 1986

[54] SOLAR ENERGY COLLECTOR APPARATUS AND METHOD

[76] Inventor: David B. Wiens, 206 S. Washington, Hillsboro, Kans. 67063

[21] Appl. No.: 651,511

[22] Filed: Nov. 1, 1984

Related U.S. Application Data

[63] Continuation-in-part of Ser. No. 480,119, Sep. 27, 1982, abandoned, which is a continuation of Ser. No. 113,179, Jan. 18, 1980, abandoned.

[51] Int. Cl.$^4$ ................................................. F24J 2/38
[52] U.S. Cl. .................................... 126/425; 126/418; 126/419; 126/422; 126/438
[58] Field of Search ............... 126/418, 419, 422, 424, 126/425, 438, 443; 250/203 R Primary Examiner—James C. Yeung
Assistant Examiner—Noah Kamen

[57] ABSTRACT

The solar energy collecting invention uses a frame to position a conduit for carrying fluid to receive solar energy reflected from a reflector also supported by the frame, for rotatable movement around the conduit. A tracking apparatus is provided to rotate the reflector around the conduit from a protected position, with the reflector facing generally earthward and northward to follow the sun. Whenever clouds or sunset stop the sunshine, the tracking apparatus will rotate the reflector to the protected position. Rotation of the reflector is controlled by use of a commutative switch directing power according to the position of the reflector, first to a holding circuit adapted to rotate the reflector from the protected position when there is adequate sunlight, and second to a tracking circuit adjusted to rotate the reflector when there is inadequate sunlight.

12 Claims, 17 Drawing Figures

SOLAR ENERGY COLLECTOR APPARATUS AND METHOD

This application is a continuation in part of Ser. No. 480,119 filed Sept. 27, 1982, now abandoned; which is a continuation of Ser. No. 113,179 filed Jan. 18, 1980, now abandoned.

BACKGROUND AND SUMMARY OF THE INVENTION

Solar energy collectors are generally provided with a transparent cover, usually glass to keep soil out. These collectors that are always exposed to the sky must use heavy glazing in order to withstand damage by hail or high winds. Even during quiet weather the glass may acquire dew at night, causing any soil in the atmosphere to adhere. This invention features an elongated parabolic reflector revolving around a conduit located along the focal line of the reflector. Sensing means are mounted on the reflector designed to control the rotation in order that solar energy may always be reflected onto conduit to heat the fluid. This is common practise amoung those in the art who control rotation by electrical means. What is new with this invention is that means are provided to discontinue the tracking whenever heavy clouds obscure the sun and rotate the reflector to what we might call the downward position. Under clear skies this rotation will begin shortly before sunset. Some of the prior art being the reflector facing the horizon for the night at the end of the day, but none are equipped to bring the reflector down under either day or night. This invention allows for light glazing, with more solar energy making it through to the conduit. Further all this is accomplished useing only two sensors in two separate circuits, with a commutative switch directing control to one or the other of these two circuits as a function of the position of the reflector. None of prior art can equal this for simplicity. With the commutative switch there need be no reverse rotation, for the wiring does not twist to accommodate a sensor mounted on a rotating reflector.

Further this invention discloses support for a stationary conduit, surrounded by a rotating reflector which avoids any physical contact between the two. Therefore the conduit may be light and made of the best heat absorbing material. Also no loss of solar energy where the reflector might be journaled onto the conduit.

Further the commutative switch makes possible a one-way rotation, driven by a belt and chains. These drives needs and idler on the slack side making reverse rotation difficult for the idler must be changed. With reverse rotation gearing is better, however more expansive than belt and chain drive. All prior electrical controls use reverse rotation.

Since the parobolic reflector concentrates so much solar energy on a small absorber, the conduit, the rotation of the reflector itself may be used to turn on and off a toggle switch controlling an electric pump, circulating fluid through the conduit. A thermostat is not needed here, however, a thermostat may be provided to turn off collecting operations whenever the desired temperature has been attained.

Further this invention discloses apparatus designed to adjust the reflector for azimuth manually. Bi-weekly reflector reflects to a focal line, not a point. this means that even though the setting for azimuth may be off slightly from the correct setting the solar energy will still impinge on the conduit to heat the fluid. This bi-weekly adjustments will do. Some collectors in the art use no adjustments at all, which means that they are at their best some time in the winter. This invention remains efficient the year round. Others adjust for changes of the sun's azimuth by employing electric or clock control which adds more to the cost than they are worth.

Some examples of prior art are U.S. Pat. Nos. 3,917,942; 3,996,460; 4,108,454; 4,146,785; 4,100,915; 4,107,521; 4.011,858; 4,205,659; 4,147,154; 4,086,485.

All these use electric controls that are more elaborate, use reverse rotation, and do not turn the reflector earthward for protection. None support reflector and conduit by the same frame independently of each other.

It is therefore an object of this invention to provide solar energy collecting apparatus using electrical motor means for rotating a reflector to track the sun, controlled by light sensor means, to hold the reflector at all times in the downward position, except when tracking the sun.

Further, it is an object of the present invention to provide a method of collecting solar energy, by incorporating a commutative switching apparatus to selectively direct electrical energy to a sensor mounted in a stationary housing, which forms part of a holding circuit when the reflector is at the downward position, starting rotation with adequate sunlight to a predetermined point for changeover to a tracking circuit. At this point the commutative switching apparatus will direct electrical energy from the holding circuit to a tracking circuit whose sensor is mounted on and rotating with the reflector, disposed in a housing built to restrict light to sunlight coming directly to the solar energy reflecting surface, in order that solar energy may be reflected onto a conduit stationed along the focal line of the reflector, to heat fluid passing through the conduit. The tracking circuit is set to rotate the reflector whenever less than the chosen quantity of light is received, and halting rotation whenever that chosen quantity is received, for at that position the reflecting surface of the reflector is directly facing the sun and reflecting solar energy onto the conduit. As the sun travels along its path less light will reach the tracking sensor, closing the circuit, starting the motor and thus nudging the reflector forward until with increased light rotation is halted. As the sun travels furhter along its path this operation will be repeated again and again, until the low sun fails to provide sufficient light to open the tracking circuit. From here on rotation will continue, until the commutative switching apparatus will again direct electrical energy to the holding circuit when the collector faces the downward position. Since the quantity of light reaching the holding circuit is insufficient to close that circuit, the reflector will remain halted for the night. If clouds had appeared during the tracking operation just described above at any time during the day, rotation to the downward position would have begun right then, thus completing a full revolution around the conduit.

Further it is an object of the present invention to provide solar energy collecting apparatus which incorporates back-up means to the electrical motor means to rotate the reflector to the protected position in the event power is lost during the tracking operation.

Further it is an object of this invention to provide a frame to support, independantly of each other, a stationary conduit for passing fluid to be heated by solar energy, and an elongated parabolic reflector, with an axis extending co-axially with that of the conduit.

Further, it is an object of this invention to provide means for adjusting the frame supporting the conduit and the reflector with hinges at the upper end, and extending apparatus at the lower end to be operated manually, these means to provide adjustment for the reflector and the conduit according to the azimuth of the sun.

In accordance with the invention, a solar energy collecting apparatus comprises a frame and a stationary conduit supported by the frame. A reflector is also supported by the frame for rotation around the conduit and has an energy reflecting surface to reflect solar energy onto the conduit to heat fluid being passed there through. An electric motor is operably connected to the reflector for rotating the reflector around the conduit. A control apparatus comprising a commutative switch, to direct electrical energy to one or the other of two control circuits according to the position of the reflector is provided. At the downward position, the holding circuit is in control. The holding circuit will direct electrical energy to the motor rotating the reflector with the advent of adequate sunlight to rotate the reflector to a predetermined point for changeover to a tracking circuit. The tracking circuit will direct electrical energy to the motor rotating the reflector in the absence of adequate sunlight.

The commutative switch mentioned above has four brushes set to slideably engage four rings to provide electrical transmission, with one of the rings divided into two segments, labeled night and day segments. The night segment is connected into the sensor holding circuit and the day segment into the sensor tracking circuit. The brushes are stationary and the rings rotate with the reflector, thus providing for switching as a function of the position of the reflector.

BRIEF DESCRIPTION OF THE DRAWINGS

Other objects and advantages of this invention will become apparent upon reading the following datailed description, and upon reference to the drawings, in which like reference characters are used throughout to designate like parts.

DETAILED DESCRIPTION OF THE PREFERRED EMBODIMENT.

Figure 1:
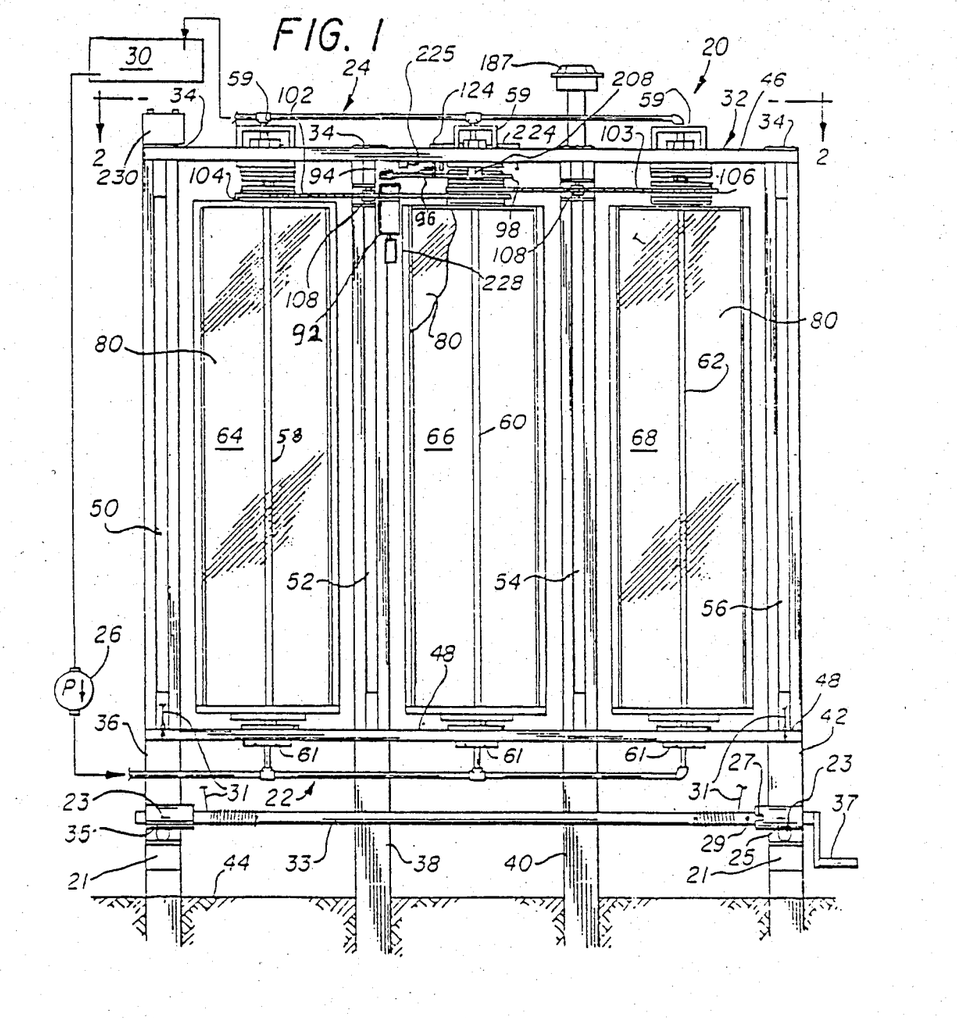
FIG. 1 is a front elevational view of solar energy collecting apparatus built according to the present invention.
Figure 2:
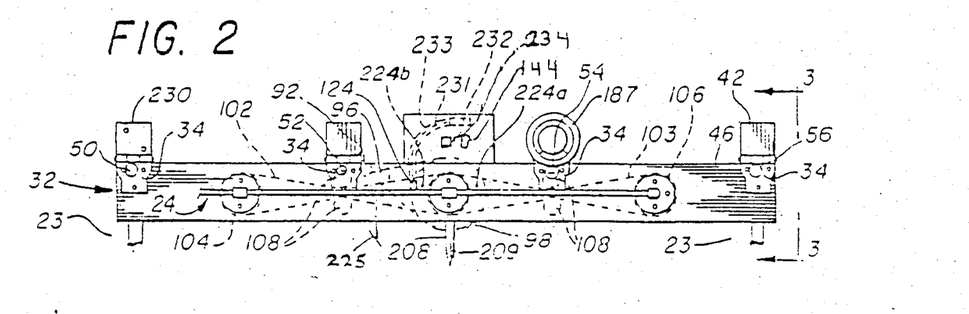
FIG. 2 is a top plan view of the embodiment of the invention shown in FIG. 1 taken in the direction of arrows 2—2.
Figures 3, 4, 5:
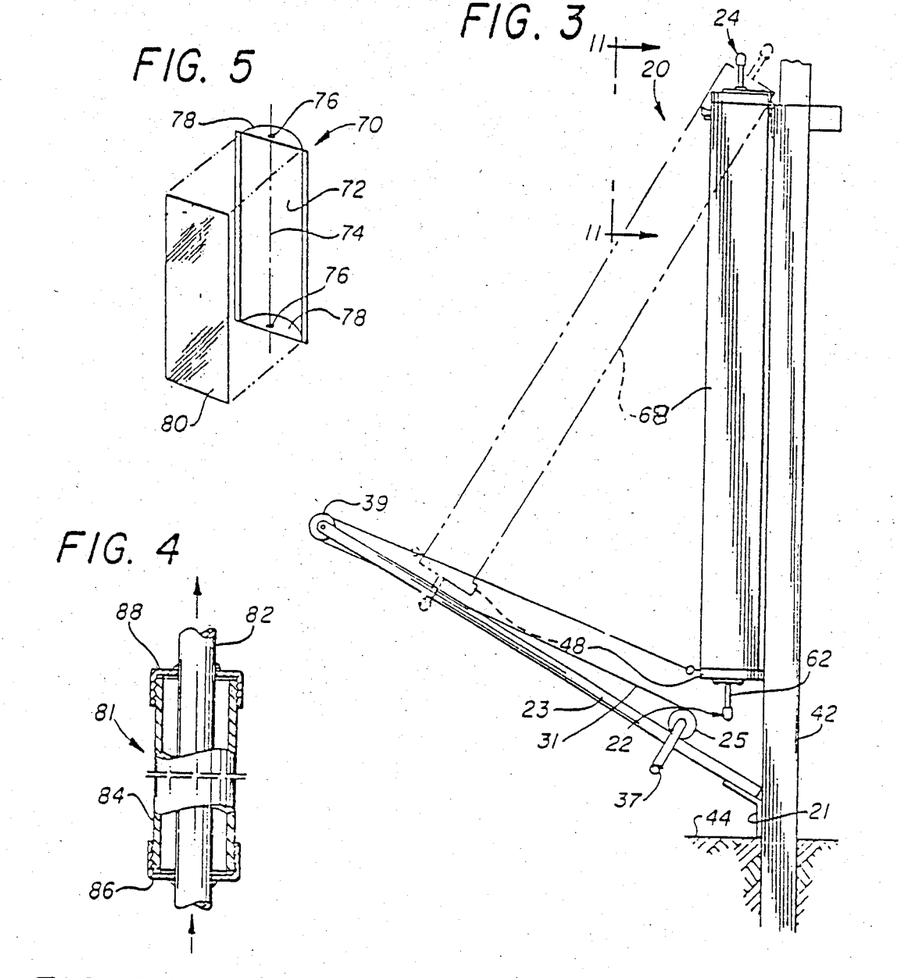
FIG. 3 is a side elevational view of the embodiment of the invention shown in FIG. 2 taken in the direction of arrows 3—3.
FIG. 4 is an enlarged view of a portion of the invention shown in FIG. 1 with portions being broken away.
FIG. 5 is an exploded view of a reflector used in the solar collecting apparatus in FIG. 1.

Turning to FIGS. 1-3 there is shown a solar energy collecting apparatus 20 constructed according to this invention. This apparatus 20 is mounted in fluid connection with a first header 22 for supplying fluid to be heated by the solar energy collecting apparatus, and a second header 24 for removing the heated fluid from apparatus 20. A pump 26 is mounted in fluid connection with first header 22 to pump the fluid from space 30 into first header 22, thence to second header 24 and then back to space 30. The fluid thus supplied to space 30 may be used for many well known purposes.

Solar energy collecting apparatus 20 comprises a frame 32 pivotally supported by hinges 34 on four legs 36, 38, 40 and 42, which are embedded in the earth 44. Frame 32 includes a first or upper cross-member 46 attached to hinges 34, a second or lower cross-member 48 extending substantially parallel to upper cross-member 46, and interconnecting members 50, 52, 54 and 56, which extend substantially parallel to one another and substantially transversely between cross-members 46 and 48. Legs 36, 38, 40 and 42 are generally aligned with one another with the alignment generally extending from west to east so that frame 32 may be rotated about hinges 34 from a storage or vertical position (as shown in solid outline in FIG. 3) to an operation or extended position (as shown in dotted outline in FIG. 3).

Apparatus 20 is moved between the two positions by a crane comprising a drum 33, a pair of cables 31 and booms 23 with one boom 23 attached by pivot 21 to post 36, and the other boom 23 attached by pivot 21 to post 42. A drum 33 extends between booms 23 and is disposed withing journals 25 and 35, which are mounted on the booms 23. A cable 31 is attached at each end of cross-member 48 and passes over pulleys 39 at the extended end of booms 23 and then back to and wound arund drum 33. A hand crank 37 is used to turn drum 33 for extending or retracting the solar energy collecting apparatus 20. Apparatus 20 is locked into the operation position by use of a pin 29 extending outwardly from drum 33 for movement into a slot 27 in journal 25.

First header 22 is placed in fluid communication with second header 24 of apparatus 20 by use of three conduits 58, 60 and 62 extending through cross-members 46 and 48. These conduits are painted a dull tropical green or black to aid in heat transfer to fluid being carried through. First conduit 58 is disposed between first and second interconnecting members 50 and 52, second conduit 60 is disposed between second and third interconnecting members 52 and 54, and third conduit 62 disposed between third and fourth interconnecting members 54 and 56.

The energy is collected in fluid carried through each conduit 58, 60 and 62 by use of parabolic reflectors 64, 66 and 68, which are rotably supported by frame 32 for moving around first conduit 58, second conduit 60, and third conduit 62, respectively.

As best seen in FIG. 5 a preferred reflector 70, representing reflectors 64, 66 and 68 is used for focusing the solar energy from reflecting surface 72, along an axis 74 which is coincidental with openings 76 provided in ends walls 78 to receive the appropriate conduit. It is preferred that axis 74 be positioned at the center of gravity of reflector 70 so as to facilitate the rotation of such reflector around the respective conduit. When desired, a solar energy transparent cover 80 cover reflecting surface 72 to keep soil from being blown into reflector 70. Since cover 80 will be directed downward during inclement weather, the glazing may be light, thus absorbing less solar energy than the usual heavy glazing, leaving more solar energy available for the conduit.

It has also been found desirable to cover the end walls 78 inside surface with a reflecive material to deflect sunlight which might impinge on these walls onto the parabolic surface to also reach the conduit. With a manual setting for the sun's azimuth, the reflectors will usually vary slightly from the correct setting. Thus the reflecting end surface provided will direct these rays onto the conduit also.

As best seen in FIG. 4, an insulating housing 81 may be used within reflector 70 and disposed around a pipe or conduit 82, representing conduit 58, 60 or 62, extending through its respective reflector. Insulator housing 81 includes a tubular solar energy transparent housing 84 and end caps 86 and 88 for disposing housing 81 concentrically around pipe 82 threadedly connected to housing 84 and jointed to pipe 82. It is preferred that this connection provides a seal sufficient to hold a vacuum between housing 84 and pipe 82.

Figure 11:
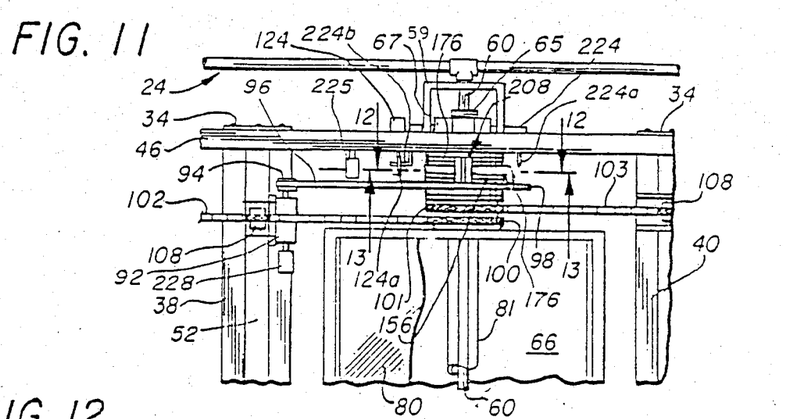
FIG. 11 is an enlarged front elevational view of a portion of the embodiment shown in FIG. 1.
Figure 12:
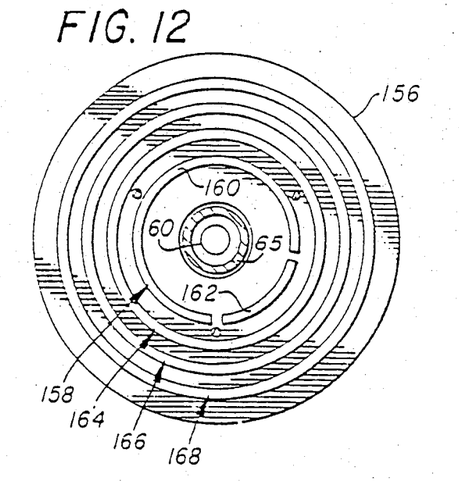
FIG. 12 is an enlarged cross-sectional view of the embodiment shown in FIG. 11 taken along the lines and in the direction of arrows 12—12.
Figure 16:
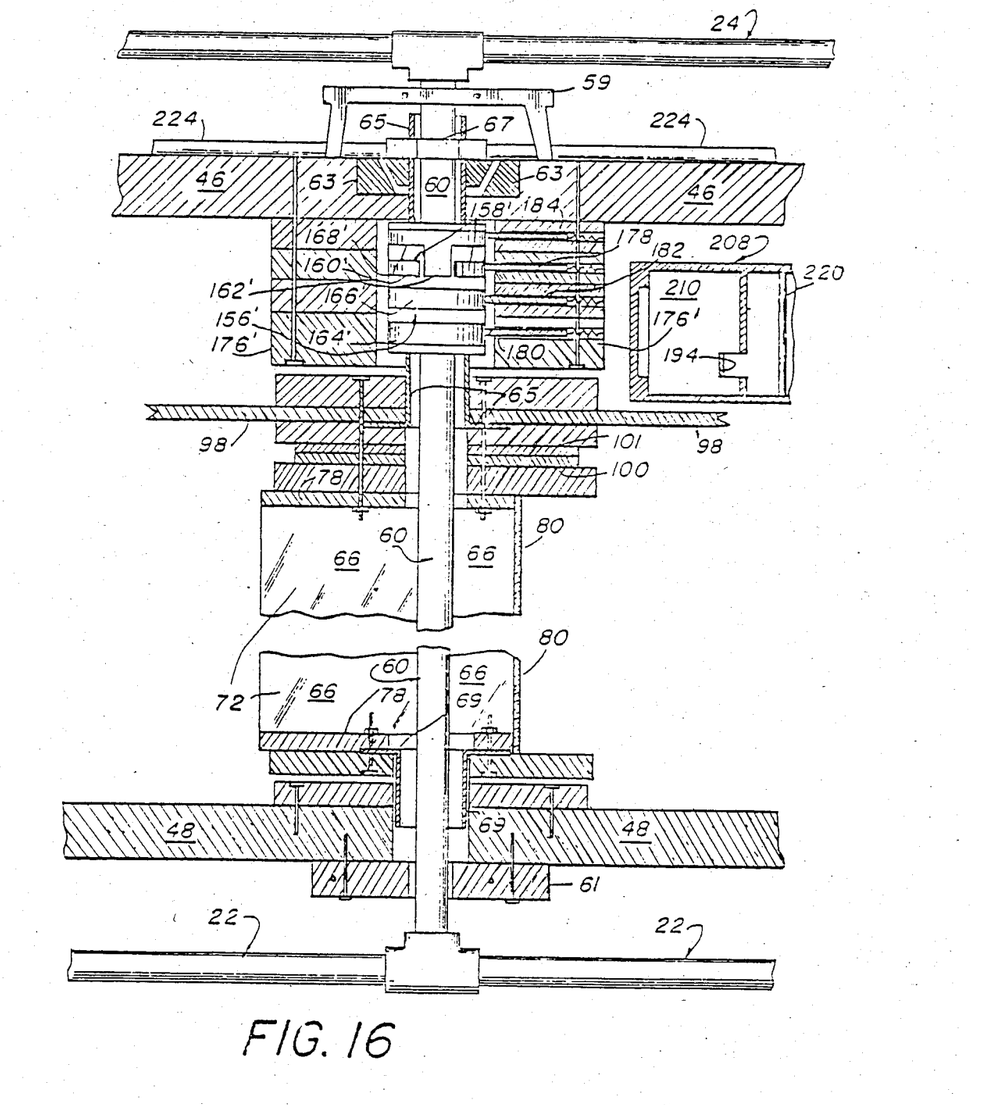
FIG. 16 is an enlarged cross-sectional of a portion of the invention shown in FIG. 1, revealing interior components, some bisected and some not bisected, and further showing certain components in a position different from the one in FIGS. 1 and 11.

As best shown in FIG. 1, 11, 16 and the details of support of conduits 58, 60 and 62, and also the rotable support of reflectors 64, 66 and 68 are revealed. Part of the support being hidden in the interior can best be shown in FIG. 16. Since FIGS. 11 and 16 being enlarged over FIG. 1, shown only conduit 60 and reflector 66, these two reference numerals will also include conduits 58 and 62 and reflectors 64 and 68 respectively. In FIG. 16 some components are shown bisected, and some not bisected.

The upper end of conduit 60 is tightly held in place by claim 59 with legs, the legs are attached to crossmember 46. The lower end of conduit 60 is loosely held, providing for expansion due to heating, by clamp 61 attached to cross-member 48. Clamp 61 is shown bisected, but clamp 59 is not bisected.

Reflector 66 carrying housing 208 (mostly base portion showing) is drawn facing the right or six o' clock, instead of the twelve o' clock position illustrated in FIGS. 1 and 11. The support for the upper end of reflector 66 is provided by sleeve with collar, 65, the collar being embedded in the upper portion of reflector 66, with the sleeve extending upwardly through tapered beraing 63 recessed into cross-section 46. The sleeve is held in place by nut 67 threaded onto sleeve 65. Except for nut 67, the reflector 66 assembly is bisected.

The support for reflector 66 at the lower end is provided by sleeve with collar 69, the collar being embedded in the lower end of reflector 66, the sleeve extending downwardly into a journal cut into crossmember 48.

As best shown in FIGS. 1-2 and 11 apparatus is provided to rotate reflectors 64, 66, and 68 around conduits 58, 60, and 62 respectively, and includes an electric gear motor 92 clamped to interconnecting member 52 of frame 32. A drive pulley 94 is cnnected to the drive shaft of motor 92 and operates through a belt 96 to rotate a pulley 98 fixedly attached to reflector 66, at a speed of about one revolution in three minutes. Reflector 64 is rotated simultaneously with reflector 66 by use of a sprocket 100 mounted for simultaneous rotation with reflector 66. Sprocket 100 drives chain 102 to rotate sprocket 104 which is connected co-axially with reflector 64. Reflector 68 is also driven simultaneously with reflector 66 by use of a sprocket 101 which is disposed on reflector 66 upwardly of sprocket 100. Sprocket 101 drives a chain 103 to rotate a sprocket 106 which is connected to reflector 68 co-axially about the reflector's axis. Idler sprockets 108 are in two pairs, one pair mounted by bracket to interconnecting member 52, and the other to member 54. One sprocket 108 of each pair is fixidly mounted with adjustments provided to adjust chains 102-103 tension legs to harmonize the rotation of reflectors 64 and 68 with reflector 66. The other sprocket 108 of each pair is slideably mounted, applying spring tension to the slack legs of chains 102-103, keeping them taut.

Figure 6:
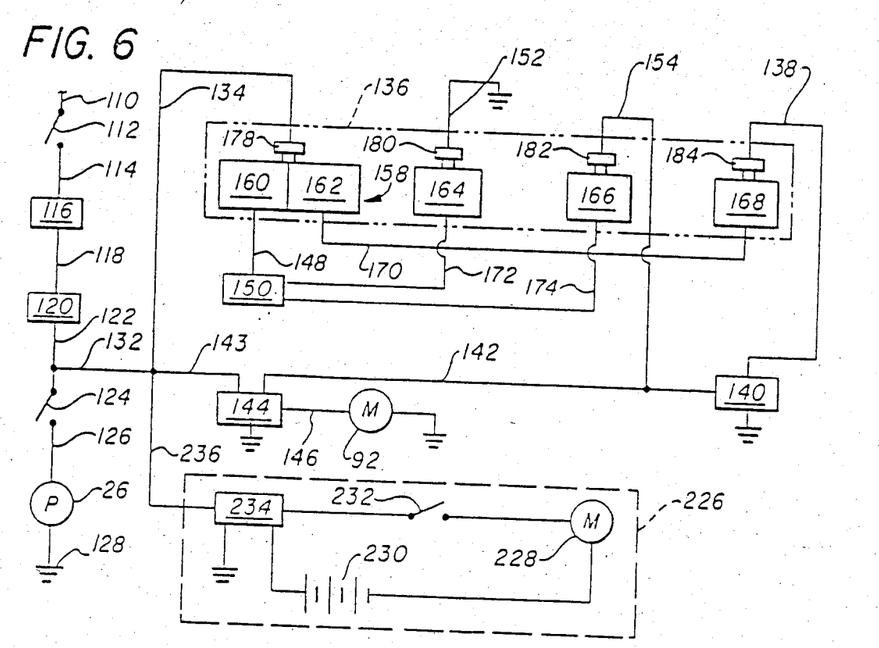
FIG. 6 is a schematic representations of an electric control circuit used to rotate the reflectors shown in FIG. 1.

A control circuit, as best shown schematically in FIG. 6, is used to activate and deactivate motor 92 in response to the amount of sunlight sensed for tracking the sun with reflecting surface 72 of each reflector 64, 66 and 68, and for rotating the reflectors toward a protecting position, which preferrably faces the earth in response to a lack of sunlight. The electrical power is supplied through a conductor 110 into an on-off switch 112 for activating the control circuit, When switch 112 is closed, power is carried through conductor 114 into a first thermostat 116, through conductor 118 to a second thermostat 120 and through conductor 122 into a second on-off switch 124. When switch 124 is closed, current will flow through conductor 126 into pump 26 and from pump 26 to ground 128. Thermostats 116 and 120 are positioned in heat transfer relation to the flow of fluid either into space 30 or out of one of the pipes 58, 60 or 62 to allow operation of the solar energy collecting apparatus as long as the temperature is below the maximum desired.

Power from conductor 122 is supplied through conductor 132 and 134 to a commutative switching apparatus of system as indicated in dotted outline 136. Electrical power is switched by the commutative switching apparatus either through conductor 138 to night switch 140 and from there through conductor 142, relay 144 and conductor 146 to motor 92, henceforth to be known as the "Holding circuit", or through conductor 148 to day switch 150 and from there to conductors 154, 142, relay 144, and conductor 146 to motor 92, henceforth to be known as the "Tracking circuit".

Figure 13:
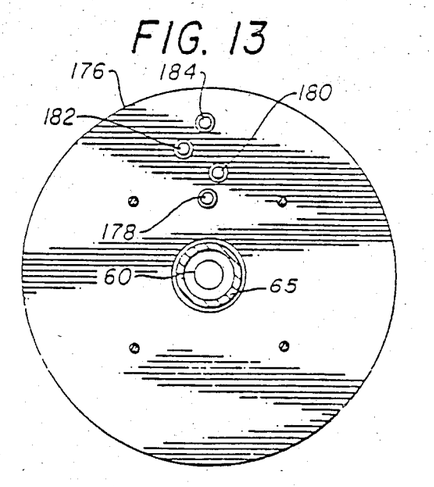
FIG. 13 is an enlarged cross-sectional view of the embodiment shown in FIG. 11 taken along the lines and in the direction of arrows 13—13.

Commutative switching apparatus 136 as best seen in FIGS. 6, 11 and 13. As illustrated commutative switching apparatus 136 includes a rotating housing 156 mounted with reflector 66. A first ring 158 is supported on housing 156 concentrically around conduit 60 and is separated into a day segment 160 and a night segment 162. A second ring 164, a third ring 166, and a fourth ring 168 are also supported on housing 156 concentrically around conduit 60 and are uninterrupted. Night segment 162 and fourth ring 168 are interconnected by a conductor 170 disposed within housing 156 and day segment 160 is connected to conductor 148. Second ring 164 is connected to a first conductor 172 leading from day switch 150 and third ring 166 is connected to a second conductor 174 leading from day switch 150.

Commutative switching apparatus 136 further includes a second housing 176 attached to cross-member 46 of frame 32 to prevent rotation thereof. A first brush 178, a second brush 180, a third brush 182 and a fourth brush 184 are disposed on second housing 176 to slideably engage first ring 158, second ring 164, third ring 166 and fourth ring 168, respectively. First brush 178 is connected to conductor 134, second brush 180 is connected to ground 152, third brush 182 is connected to conductor 154 and fourth brush 184 is connected to conductor 138.

Figure 7:
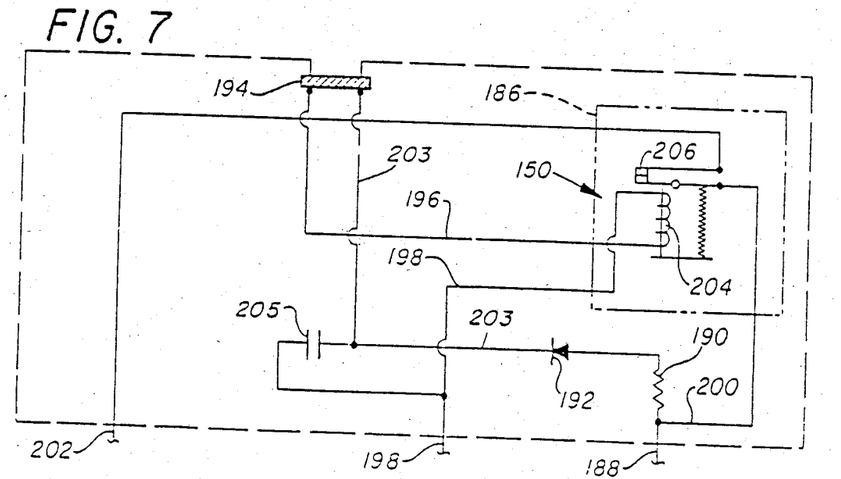
FIG. 7 is a schematic representation of a portion of the electrical control circuit shown in FIG. 6.
Figure 8:
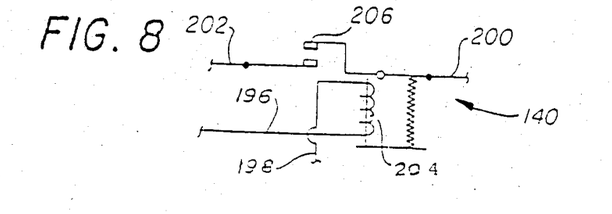
FIG. 8 is a schematic representation of a portion of the apparatus schematically represented in FIG. 7 so as to provide a different portion of the electric control circuit shown in FIG. 6.

Turning now to FIGS. 7 and 8 there are shown day and night photoelectric switch schematics, which are identical except for relay 186 shown in dotted outline in FIG. 7. In FIG. 7, the relay 186 shows day photoelectric switch 150 used in the tracking circuit, and FIG. 8 illustrates relay 186 used in the night photo-electric switch 140 in the holding circuit. In FIGS. 7 and 8 relays are shown having single pole, single throw contacts. However, in practise, it is simpler to provide relays with double throw contacts with one pair normally open, and one pair normally closed. The circuit shown in FIG. 7 illustrates the day switch where the normally closed contacts are wired. Likewise in FIG. 8, the open ones would be used as illustrated for the night switch. In operation both switches have power supplied through conductor 188, the through resistor 190, diode 192, conductor 203, sensor 194, conductor 196, coil 204, conductor 198, and may also have power supplied through conductor 200, points 206 and conductor 202 out of the switch. As sensor 194 senses more light, less resistance is provided within its circuit, thereby permitting additional current flow into coil 204, opening contact points 206 in the day switch, as illustrated in FIG. 7, and closing contact points 206 as illustrated in night switch 140, as illustrated in FIG. 8. In day switch 150, of the tracking circuit conductor 188 is connected to conductor 148, conductor. 198 is attached to conductor 172 leading through ring 164 and brush 180 of the commutative switching apparatus, and conductor 152 to ground. Conductor 202 is attached to conductor 174 leading through ring 166, brush 182, conductors 154, 142, relay 144 and conductor 146 to motor 92. In night switch 140 of the holding circuit, conductor 188 is connected to conductor 138, conductor 198 goes to ground, and conductor 202 is attached to conductor 142, and from there follow the same path as in the day switch to motor 92. A capacitator 205 is disposed in the day and night switching circuits to discharge electric current through semnsor 194 and relay 186 when diode 192 is blocking the current.

When a predetermined quantity of light is sensed by sensor 194 in night switch 140 of the holding circuit, the electrical power flowing through conductor 134, brush 178, night segment 162 of ring 158, conductor 170, fourth ring 168, fourth brush 184 and and conductor 138 continues flowing through conductors 188 through 202 of night switch 140 and conductor 142 to control relay 144, thereby closing relay 144 directing electrical power through conductors 143 and 146 to motor 92 for activation thereof until night segment 162 no longer contacts first brush 178 and day segment 160 engages first brush 178. Electrical power will then flow in the tracking circuit from first brush 178, day segment 160, conductor 148 and conductors 188 through 202 of day switch 150, conductor 174, third ring 166, third brush 182, conductors 154 and 142, closing relay 144, bringing power through conductors 143 and 146 to motor 92. The rotation of reflector 66 will continue until sensor 194 of day switch 150 in the tracking circuit, senses the predetermined amount of light, opening points 206 of day switch 150, to deactivate motor 92 and halt rotation of reflector 66, for reflecting surface 72 is reflecting solar energy onto the conduit to heat the fluid. As the sun continues along its path less and less light will reach sensor 194 until points 206 of the day switch 150 close again, thereby activating motor 92 to nudge reflector 66 forward until enough light is again sensed. However when clouds reduce the light to sensor 194 of day switch 150 motor 92 will continue to be activated until first brush 178 once again contacts night segment 162 of first ring 158, bringing night switch 140 of the holding circuit back into the circuit. Since sensor 194 of night switch 140 will not be receiving sufficient light to close points 206, motor 92 will be inactivated, thus halting rotation of reflector 66 until the sun comes back.

In summary the commutative switching apparatus 136 is shown directing control as a function of the position of the reflector to first a holding circuit, then a tracking circuit, and then returning to the holding circuit.

Figure 14:
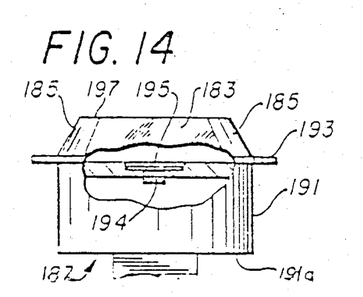
FIG. 14 is an enlarged front elevational view of a portion of the invention shown in FIG. 1 with portions being broken away.
Figure 15:
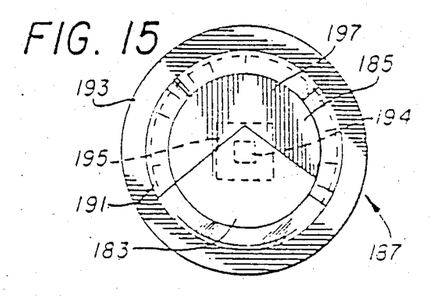
FIG. 15 is a top plan view of the portion of the invention shown in FIG. 14.

As bast seen in FIGS. 1 and 14–15, a night switch housing 187 is mounted on top of post 40 so as not to turn with the frame or reflectors. Housing 187 includes a circular side wall 191, a bottom 191a, a transparent cover 193, and a dome 197. Dome 197 has a painted area 185 and a clear area 183 for receiving light, acting as a light director to limit sunlight capable of impinging on sensor 194 of night switch 140 to the daylight hours of from 9 AM. to 5 PM. As we shall see, the opening admitting light to night switch 140 is much larger than the opening admitting light to day switch 150. Therefore darkened lens 195 may be placed under transparent area 183 to further limit the quantity of light reashing sensor 194. Sensor 194 of night switch 140 should not begin rotation of reflector 66 unless sensor 194 of day switch 150 is able to halt it.

Figure 9:
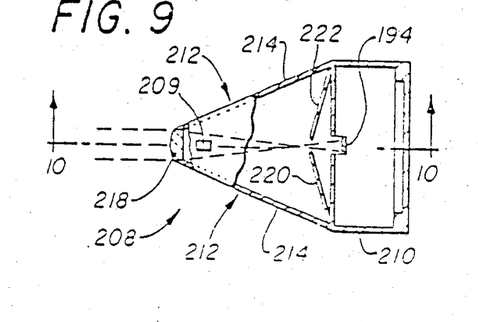
FIG. 9 is a top plan view partly in section of a housing used with a portion of the electric apparatus schematically illustrated in FIG. 6.
Figure 10:
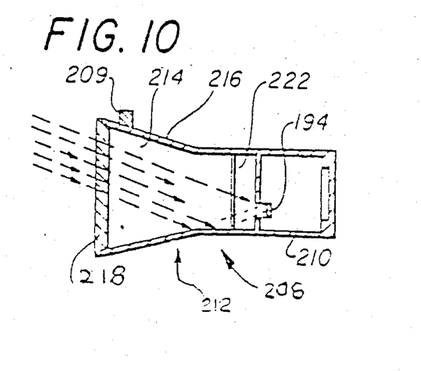
FIG. 10 is a slide cross sectional view of the housing shown in FIG. 9 taken along lines 10—10.

As best shown in FIGS. 9–11, a day switch housing 208 is used to limit the quantity of light capable of impinging on sensor 194 of the day switch 150 to the light coming directly toward reflector 66 from the sun. Housing 208 includes a rectangular base portion 210 which supports sensor 194, and may also support the remaining elements illustrated in FIG. 7, and an upper portion 212 which restricts the amount of light capable of impinging sensor 194. Portion 212 includes side walls 214 tapering toward one another and end walls 216, which may be lined with a reflecting material, tapering outwardly of one another with the outboard ends of the walls forming a slit, an opening which may support lens 218, which permits light to pass inwardly of housing 208 to be sensed by sensor 194. Also plates 220 and 222 are disposed angularly toward one another forming a second slit in front of sensor 194 to further limit light to sensor 194. These two slits are disposed in a generally verticle plane to accomodate to some degree for an incorrect setting for azimuth of the sun, since this setting is made manually. Since housing 208 is mounted on reflector 66 outside of the area of reflecting surface 72, housing 208 should be adjusted with respect to the face of reflector 66, that the line beginning with sensor 194 extending through the general center of the two mentioned slits will be parallel to a perpendicular to the face of reflector 66.

As best shown in FIGS. 6 and 11, switch 124 may be placed on first cross-member 46 for co-operating with a relatively stiff projection 209 on housing 208 to activate and inactivate pump 26 in response to the tracking operation of solar energy collecting apparatus 20. As shown toggle 124a of switch 124 is moved to the closed position when projection 209 rotating with reflector 66 near the sunrise position engages projection 224a at the end of an elongated inverted "U" rod 224 which transfers this movement to projection 224b against toggle 124a closing switch 124. Switch 124 is opened by projection 209 rotating with reflector 66 engaging toggle 124a as reflector 66 is near the sunset position. This movement also returns rod 224 to the original position.

As best seen in FIGS. 1, 2, and 11, flag 225 may placed in front of the evening approximately 5 o'clock position of housing 208 of reflector 66, thereby shading sensor 194 of a day switch 150 to bring solar connecting operation to a close at that time for the day. This feature is useful in an array of reflectors as this will prevent shading of a reflector by the neighboring reflector.

In the holding circuit night segment 162 of ring 158 is adjusted with respect to brush 178 that initial contact between the two is made when reflector 66 is at the downward position. If the rotation of reflector were by the clock from sunset to sunrise the downward position would be at or near midnight. The downward position has also been designated as protected for the face of the reflectors are shielded from the sky.

The position to begin tracking must be somewhat forward from the downward position, but not so far forward that sensor 194 of day switch 150 rotating with reflector 66 could be affected by the sun at sunrise. A good place to begin tracking is from thirty to sixty degrees forward from the downward position. The position chosen is where initial contact of day segment 160 with brush 178 is to be made. After the initial contact, the tracking circuit being in control, contact points 206 of day switch 150 in circuit with motor 92 being normally closed, the rotation will continue until sensor 194 of day switch 150 will receive the predetermined quantity of light to open contact points 206 in the tracking circuit to halt rotation of reflector 66, for reflecting surface 72 is reflecting solar energy onto conduit 60 to heat the fluid. With forward movement of the sun light to sensor 194 will decrease which closes points 206 for nudging reflector 66 forward until points 206 are open with the predetermined amount of light. With a low sun or cloudy skies contact points 206 will remain closed until brush 178 will engage night segment 162 at the downward position. Since there will be insufficient light to close points 206 of night switch 140, reflector 66 will remain at the downward position until the sun comes back.

Turning again to FIG. 16 there is shown an improved commutative switch 136. The components being in the interior, cannot be shown in FIGS. 1 and 11. Therefore FIG. 16 is an enlarged view of a portion of FIG. 1 with most of the components bisected and the front half removed. The reference numerals applied will be the same according to function as in the former model. If the form of the new embodiment differs from the former the suffix "'" will be added.

Housing 156' supporting the rings, is no an insulator cylinder mounted on sleeve 65 rotating co-axially with reflector 66. Insulator cylinder 156' is better not bisected to show the rings. The rings on cylinder 156', one above the other, all of the same diameter are rotating co-axially with reflector 66. Ring 168' at the top is provided with a side extension extending downwardly to form night segment 162' of ring 158'. Thus conductor 170 is not needed. Ring 168' with night segment 162' are in the holding circuit. Ring 158' serving as lead-in is next in line, now needing only day segment 160', for the tracking circuit. Next below ring 166' is also in the tracking circuit. At the bottom is ring 164 providing a ground.

Housing 176' is now a series of sheaves with the brushes inserted from the side in position to slidably engage the rings. The embodiment of the brushes being unchanged with only their position differing from the former embodiment, the numerals will not have the "'" added.

Brush 184 for ring 168' is at the top, followed by brush 178 as lead-in for ring 158', next brush 182 for ring 166' and at the bottom brush 180 for ring 164'.

As illustrated the brushes are inserted from the right to reveal the construction of the rings but they may be inserted into housing 176' anywhere around the circumference, as long as insulator cylinder 156' is adjusted on sleeve with collar 65 so that initial contact of brush 178 with night segment 162' of ring 158' is made when reflector 66 is at the midnight or downward position.

The improved embodiment of commutative switching apparatus 136 is superior to the former one in these respects: 1, Night segment 162' now a part of ring 168' is easier to position in proper alignment with day segment 160'; 2, the brushes may be inserted and removed with out taking down reflector unit; 3, peep hole may easily be provided for inspection of brushes and rings; 4, the area of contact between brushes and rings is away from the weather.

As shown in FIGS. 1, 2, 6 and 11 a back-up system 226 may be provided to rotate reflectors 64, 66 and 68 toward the earth and the preferred protected position should a power failure develop during the tracking operation. It will also turn the reflectors to this position, whenever the master switch 112 is pulled to close down collecting operations. This back-up system 226 includes a second motor 228 whose shaft is coupled to the armature shaft of gear motor 92 to drive pulley 94 to also rotate the reflectors. Motor 228 is attached to motor 92 by a bracket (not shown). Power is supplied to motor 228 by battery 230, as seen in circuit 226. Motor 228 is controlled by toggle switch 232 and power sensing relay 234 receiving power through conductor 236. Toggle switch 232 is closed by string 231 passing from the toggle through curved tubed tube 233 to connect with projection 224b. Whenever projection 209 on housing 208 rotating near the sunrise position moves projection 224a thus transferring this movement to projection 224b against toggle 124a to start pump 26, string 231 will close toggle switch 232. The contact points of relay 234 being held open by hi-line current through the coil will close whenever that current is lost, thus comprising the circuit of motor 228 with battery 230, thus rotating reflector 66, together with reflectors 64 and 68 to the protected position where projection 209 engages the toggle of switch 232, opening the switch, halting further rotation.

A converter 235 may be provided to charge battery 230.

Turning now to FIGS. 7, 8, 16 and 17, there is shown a schematic representation of a modified version of the commutative switching apparatus 136. In photo-electric day switch 150, diode 192, and capacitor 205 and also relay, shown in dotted outline 186, are removed from housing 208, and placed in the tracking circuit outside of apparatus 136, where it is convenient to show the new connections. Resistor 190 may be left in or moved out whichever is convenient. Sensor 194 in day switch 150 must remain within housing 208 and be connected to conductor 188 by conductor 203. The components removed are the only ones needing a ground, which can now be provided without ring 164', brush 180 and ground 152.

Figure 17:
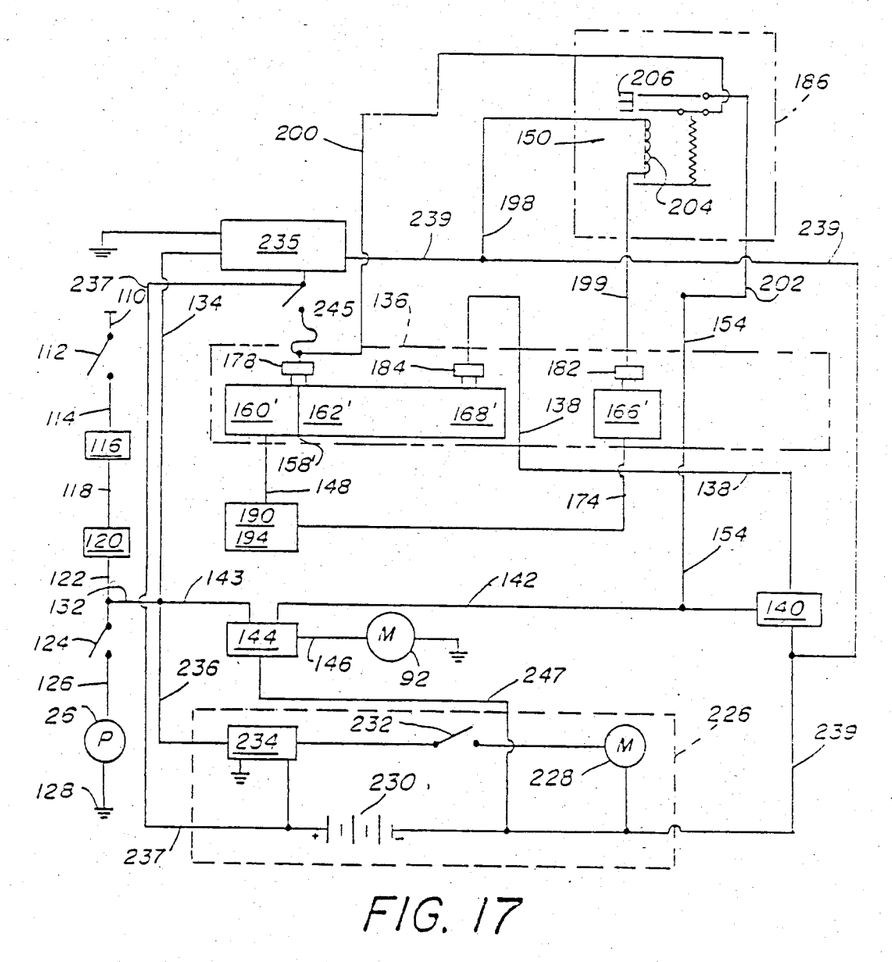
FIG. 17 is a schematic representation of a modification of the control circuit shown in FIG. 6.

Apparatus 136 is further modified by using direct current available from the back-up system furnished by converter 235 and battery 230 via toggle switch, fuse, and conductor (all denoted by numeral 245), the fuse providing protection from overload. Converter 235 and battery 230 are interconnected by conductors 237 and 239 with 239 serving as negative. This modification eliminates the need for diode 192 and capacitor 205 in both day 150 and night 140 switches, thus simplifying the circuit. The connections for the fully modified commutative switching apparatus 136 as illustrated in FIG. 17 are as follows: In night switch 140 conductors 188 and 200 still joined go to conductor 138. Conductor 198 joins conductor 239. Conductors 202 and 142 are still joined. In day switch 150 conductor 188 still joins conductor 148. Conductor 200 now off conductor 188 joins conductor 245.

Conductor 196 now off coil 204 goes to conductor 174.

Conductor 154 is removed from brush 182 to join conductor 202.

Conductor 199 joins brush 182 to coil 204. Conductors 170 and 172, ring 164', brush 180 and ground 152 are out of the switching apparatus 136, conductors 198 and 239 are joined.

Relay 144 now has direct current through the coil and hi-line current through the points. The ground must be replaced with conductor 247 to conductor 239.

Converter 235 is fed hi-line through conductor 134.

In operation, frame 32 is rotated about hinges 34 to position reflectors 64, 66, and 68 so that they extend generally perpendicular to the arc of the travel of the sun from east to west. Switch 112 is moved to the "On" position which thereby provides current to night switch 140. In the event there is sufficient sunlight, motor 92 is activated and reflectors 64, 66 and 68 are rotated until first brush 178 no longer contacts night segment 162 and is contacting day segment 160, and projection 209 throws toggle 124a to activate pump 26. Direct light will then pass into day switch housing 208 to be sensed by sensor 194 until a predetermined amount exists within such housing, motor 92 is inactivated and reflectors 64, 66 and 68 are directed toward the sun, reflecting solar energy onto the conduit to heat the fluid.

As the sun proceeds on its path, less and less light will be sensed by sensor 194 within day switch housing 208 and when the amount of light sensed drops below a predetermined quantity, motor 92 is activated to rotate the reflectors until a sufficient quantity of light is again sensed to inactivate motor 92, at which time the reflectors will be facing the sun. Should inclement weather develop, there will be insufficient light within housing 208 to inactivate motor 92, which causes the reflectors to continue to rotate until they face the earth, which thereby protects the reflecting surface of the reflectors from damage, and also halting circulation through the conduits because pump 26 has been turned off as projection 209 engages toggle 124a. After the inclement weather passes, sufficient light will be sensed by photoelectric night switch 140 to activate motor 92 which rotates the reflectors around the conduit to the beginning tracking position at which time the day switch 150 with contact points 206 being normally closed come into the circuit, causing rotation of the reflectors to continue until the sufficient light sensed by sensor 194 of day switch 150 contact points 206 open once again for the reflectors are once again in position to reflect solar energy onto the conduit. The circulation is also restored when projections 209 engage toggle 124a through rod 224 to start pump 26. Thus the operation continues until thermostat 116 or 120 sensing the maximum temperature desired, opens the contacts thereby denying power to the solar energy collecting apparatus, and closing relay 234 to activate back-up motor 228 to then rotate the reflectors to the downward position where projection 209 opens switch 124 in circuit with pump 26, now also opens switch 232, halting rotation of the reflectors at the downward position where the reflector faces are shielded from the sky. Upon cooling of the fluid thermostats 116 and 120 will close the contacts, making possible solar energy collecting when ever there is sufficient sunlight.

I claim:

1. A system for collecting solar energy comprising:
   (A) frame supporting a conduit and reflector means, said reflector means focusing solar energy on said conduit means, wherein said conduit means heats fluid passing therethrough;
   (B) motor means for turning said reflector means around said conduit means;
   (C) electric control switching means directing control to either a holding circuit means or a tracking circuit means as a function of the position of said reflector means, both of said circuit means controlling said motor means,
      i. the holding circuit means to hold said reflector means in a downward position when the solar energy is less than a predetermined amount, and then to direct said motor means to turn said reflector means to face where the sunrises are when the solar energy is greater than a predetermined amount,
      ii. the tracking circuit means having control when the reflector means faces the sunrises, and when there is more solar energy than said predetermined amount to have the reflector face the sun, and further to rotate the reflector to a downward position when the solar energy is less than said predetermined amount, where upon said electric control switching means passes control back to said holding circuit means.

2. A system for collecting solar energy as set forth in claim 1, wherein said support of said conduit means by said frame includes,
   (A) an upper clamp with legs means fitting tightly around said conduit means attached to an upper section of said frame, (B) and lower clamp means fitting loosely around said conduit means providing allowance for expansion due to heating, said clamp means attached to a lower section of said frame.

3. A system for collecting solar energy as set forth in claim 1, wherein said support by said frame for turning said reflector means around said conduit means includes, sleeve with collar means extending co-axially around said conduit means provided for the upper and lower ends respectively of said reflector means comprising,
  (A) an upper sleeve with collar means provided with threads and nut means for suspending said reflector means from
    i. tapered bearing means recessed into an upper section of said frame,
  (B) and said lower sleeve with collar means journaled into a lower section of said frame.

4. A system for collecting solar energy as set forth in claim 1, wherein said motor means for turning said reflector means around said conduit means includes,
  (A) electric gear motor means belted to said reflector means for turning said reflector means;
  (B) back-up electric motor means, with shaft coupled to the armature shaft of said gear motor means, powered by a battery for turning said reflector means to said downward position in the event of absence of electric power;
  (C) converter means for charging said battery.

5. A system for collecting solar energy as set forth in claim 1, wherein said electric control switching means includes commutative switching means comprising a series of stationary brush means positioned to slideably engage a like number of ring means respectively, said ring means rotating co-axially with said reflector means providing portions of a holding circuit and a tracking circuit, with one set of brush ring means serving
  (A) as lead-in, said ring means divided into two segments, a night segment connected into said holding circuit, and a day segment connected into said tracking circuit, with
  (B) another in said holding circuit said ring means provided with a side extension forming said night segment of said lead-in ring means,
  (C) another in said tracking circuit, in circuit with said day segment,
  (D) and another as grounding means for said circuit means.

6. A system for collecting solar energy as set forth in claim 1, wherein said holding circuit means includes a photo-electric switch with contact points in circuit of said motor means being normally open and which close when the sensor of said switch is exposed to a predetermined amount of solar energy; said switch is disposed in a stationary housing admitting light through a dome with transparent area in the form of an inverted "V", the balance of said dome being impervious to light, thus limiting light reaching a sensor of said photo-electric switch to the major daylight hours of the day.

7. A system for collecting solar energy as set forth in claim 1, wherein said tracking circuit means includes the sensor of a photo-electric switch with contact points in circuit of said motor means being normally closed and which opens when said sensor of said tracking means switch is exposed to a predetermined amount of solar energy; said tracking means switch is disposed in a housing mounted to rotate with said reflector means, said housing admits light to said sensor of said photo-electric switch through two generally vertical slits disposed parallel to a perpendicular to the face of said reflector means.

8. A system for collecting solar energy as set forth in claim 1, wherein said reflector means focusing solar energy on said conduit means includes,
  (A) an elongated parabolic reflector with focal axis extending along a generally vertical line perpendicular to the azimuth of the sun,
  (B) said conduit means extending co-axially with said reflector means,
  (C) extending means for extending and retracting said conduit and reflector means between
    i. a storage position in which said reflector means is in an upright position,
    ii. and an operational position in which said reflector means is oriented perpendicular to the sun's azimuth.

9. A system for collecting solar energy as set forth in claim 8, wherein said extending means includes;
  (A) a hinged support means for said frame at the upper end,
  (B) crane means for extending the lower section of said frame comprising
    i. boom means, attached to said frame support means,
    ii. drum means
      (a) having hand crank means for rotating said drum means,
      (b) lock means for holding said drum means from rotating,
    iii. cable means secured to said frame and drum means and extending over an end of said boom means.

10. A system for collecting solar energy as set forth in claim 1 further comprising electric pump means for moving fluid through said conduit means, said switching means operates the pump means when said reflector faces the sun.

11. A system for collecting solar energy as set forth in claim 1, comprising an array of conduit and reflectors means, said reflector means connected for simultaneous rotation by sprocket and chain means.

12. A system for collecting solar energy as set forth in claim 11, wherein said array includes shield means disposed in a predetermined position for shading a light sensor means of said tracking circuit means when one of said reflector means casts a shadow on another of said reflector means in said array to thereby halt solar collection.

* * * * *

UNITED STATES PATENT AND TRADEMARK OFFICE
CERTIFICATE OF CORRECTION

PATENT NO. : 4,632,091

DATED : December 30, 1986

INVENTOR(S) : David B. Wiens

It is certified that error appears in the above-identified patent and that said Letters Patent is hereby corrected as shown below:

```
In Claim 7, column 14, line 7;   "solar energy said
tracking means switch is disposed in a" should read
--solar energy; said tracking means sensor is
disposed in a --
```

Signed and Sealed this

Twentieth Day of October, 1987

Attest:

DONALD J. QUIGG

Attesting Officer

Commissioner of Patents and Trademarks